Oct. 8, 1968 W. H. CASTLE ET AL 3,404,766

VARIABLE SPACEBAR MECHANISM FOR AUTOMATICALLY OPERATED PROPORTIONAL ESCAPEMENT PRINTER

Filed Sept. 19, 1966 4 Sheets-Sheet 1

INVENTORS.

WILLIAM H. CASTLE
JOHN E. JONES
ROBERT A. RAHENKAMP

BY Paul D. Carmichael

ATTORNEY.

FIG. 6

| TRANSLATOR SEEKER | TYPEWRITER CHARACTER OR FUNCTION | CODE SLIDES | | | | | | | ESCAPEMENT UNITS | |
|---|---|---|---|---|---|---|---|---|---|---|
| | | 100 | 101 | 102 | 103 | 104 | 105 | 106 | LOWER CASE | UPPER CASE |
| 1 | LOWER CASE | 0 | 0 | 1 | 1 | 1 | 1 | 0 | | |
| 2 | TAB | 0 | 0 | 1 | 0 | 0 | 1 | 0 | | |
| 3 | UPPER CASE | 0 | 0 | 1 | 1 | 1 | 0 | 0 | | |
| 4 | NO PRINT | 0 | 0 | 0 | 0 | 0 | 0 | 1 | | |
| 5 | 1 | 0 | 0 | 0 | 1 | 0 | 0 | 0 | 6 | 4 |
| 6 | SPACE BAR | 0 | 0 | 1 | 0 | 1 | 1 | 0 | 7 | 7 |
| 7 | Q | 1 | 1 | 0 | 0 | 1 | 1 | 0 | 6 | 8 |
| 8 | A | 1 | 1 | 0 | 1 | 0 | 1 | 0 | 5 | 8 |
| 9 | 2 | 1 | 0 | 0 | 0 | 0 | 0 | 0 | 6 | 6 |
| 10 | Z | 1 | 1 | 1 | 1 | 0 | 0 | 0 | 5 | 7 |
| 11 | W | 1 | 1 | 1 | 0 | 0 | 1 | 0 | 8* | 9 |
| 12 | S | 0 | 1 | 1 | 0 | 0 | 1 | 0 | 4* | 6 |
| 13 | 3 | 1 | 0 | 0 | 1 | 0 | 0 | 0 | 6 | 6 |
| 14 | X | 0 | 0 | 0 | 1 | 1 | 0 | 0 | 6* | 8 |
| 15 | E | 0 | 1 | 0 | 0 | 1 | 0 | 0 | 5 | 7 |
| 16 | D | 0 | 1 | 0 | 1 | 1 | 0 | 0 | 6 | 8 |
| 17 | 4 | 0 | 1 | 1 | 1 | 0 | 0 | 0 | 6 | 6 |
| 18 | C | 1 | 1 | 0 | 1 | 1 | 0 | 0 | 5 | 7 |
| 19 | R | 0 | 1 | 0 | 1 | 0 | 1 | 0 | 4 | 8 |
| 20 | F | 1 | 0 | 0 | 1 | 1 | 1 | 0 | 4 | 7 |
| 21 | 5 | 0 | 1 | 0 | 0 | 0 | 0 | 0 | 6 | 8 |
| 22 | V | 1 | 0 | 0 | 1 | 0 | 1 | 0 | 5 | 8 |
| 23 | T | 0 | 0 | 0 | 0 | 1 | 0 | 0 | 4 | 7 |
| 24 | G | 0 | 0 | 0 | 1 | 1 | 1 | 0 | 5 | 8 |
| 25 | 6 | 1 | 1 | 0 | 0 | 0 | 0 | 0 | 6 | 4* |
| 26 | B | 1 | 1 | 1 | 0 | 1 | 0 | 0 | 6 | 7 |
| 27 | Y | 0 | 1 | 1 | 0 | 1 | 1 | 0 | 6 | 8 |
| 28 | H | 0 | 1 | 1 | 0 | 1 | 0 | 0 | 6 | 8 |
| 29 | 7 | 0 | 1 | 0 | 1 | 0 | 0 | 0 | 6 | 8 |
| 30 | N | 1 | 0 | 0 | 0 | 1 | 0 | 0 | 6 | 8 |
| 31 | U | 1 | 0 | 0 | 1 | 1 | 0 | 0 | 6 | 8 |
| 32 | J | 0 | 0 | 0 | 0 | 1 | 1 | 0 | 3 | 5* |
| 33 | 8 | 1 | 1 | 0 | 1 | 0 | 0 | 0 | 6 | 6 |
| 34 | M | 0 | 0 | 0 | 1 | 0 | 1 | 0 | 9 | 9 |
| 35 | I | 1 | 1 | 0 | 0 | 0 | 1 | 0 | 3 | 4 |
| 36 | K | 1 | 1 | 0 | 0 | 1 | 0 | 0 | 6 | 8 |
| 37 | 9 | 1 | 1 | 1 | 0 | 0 | 0 | 0 | 6 | 4 |
| 38 | , | 1 | 1 | 0 | 1 | 1 | 1 | 0 | 3* | 3* |
| 39 | 0 | 0 | 1 | 1 | 1 | 0 | 1 | 0 | 6 | 8 |
| 40 | L | 0 | 1 | 1 | 1 | 1 | 0 | 0 | 3 | 7 |
| 41 | ZERO | 0 | 1 | 1 | 0 | 0 | 0 | 0 | 6 | 4 |
| 42 | . | 1 | 0 | 0 | 0 | 0 | 1 | 0 | 3 | 3 |
| 43 | P | 0 | 1 | 0 | 0 | 1 | 1 | 0 | 6 | 6* |
| 44 | ? | 0 | 1 | 0 | 1 | 1 | 1 | 0 | 5 | 8 |
| 45 | — | 1 | 1 | 1 | 0 | 1 | 1 | 0 | 3 | 8 |
| 46 | ; | 0 | 1 | 1 | 1 | 1 | 1 | 0 | 3 | 4 |
| 47 | ] | 0 | 0 | 0 | 0 | 0 | 1 | 0 | 6 | 8 |
| 48 | [ | 0 | 1 | 0 | 0 | 0 | 1 | 0 | 5* | 8* |
| 49 | = | 1 | 0 | 0 | 0 | 1 | 1 | 0 | 6 | 8 |
| 50 | BACKSPACE | 0 | 0 | 1 | 1 | 0 | 1 | 0 | | |
| 51 | CARRIER RETURN | 0 | 0 | 1 | 0 | 0 | 0 | 0 | | |

United States Patent Office 3,404,766

Patented Oct. 8, 1968

3,404,766

VARIABLE SPACEBAR MECHANISM FOR AUTOMATICALLY OPERATED PROPORTIONAL ESCAPEMENT PRINTER

William H. Castle, Winchester, and John E. Jones and Robert A. Rahenkamp, Lexington, Ky., assignors to International Business Machines Corporation, Armonk, N.Y., a corporation of New York Filed Sept. 19, 1966, Ser. No. 580,275

7 Claims. (Cl. 197—84)

ABSTRACT OF THE DISCLOSURE

A remotely or automatically operated proportional escapement typewriter provides multiple increments of spacing with a minimum of mechanism. An electrical-to-mechanical translator has a no-print seeker which actuates the no-print mechanism of the proportional escapement typewriter concurrently with the selection of any one of a group of character seekers which in turn actuate any one of a corresponding group of character selection and escapement devices. The print element moves relative to the printing platen by a distance corresponding to the selected character, but the no print mechanism inhibits printing.

The present invention relates generally to the typewriter and printing arts, and more particularly to mechanism for obtaining variable spacebar increments in an automatically or remotely operated printer. The printer may be a proportional escapement typewriter which is automatically actuated by a data processor operating on unjustified character information to produce justified output copy by varying the size of the spaces between words or characters in the output copy.

In copending patent application Ser. No. 311,373, entitled, "Proportional Escapement Apparatus for a Single Element Typewriter," filed Sept. 25, 1963, now Patent 3,346,086 issued Oct. 10, 1967 to W. O. Cralle, Jr. et al. and assigned to the assignee of the present invention, there is disclosed a single element typewriter wherein the print element moves variable extents relative to a printing platen in accordance with the widths of the selected characters. The escapement mechanism comprises a pin wheel carrying a large number of movable pins. When a character is selected by the typist, a pin setting assembly is operative to move the required pins so that the distance between adjacent set pins within the pin setting mechanism corresponds to the width or escapement distance associated with the selected character. An escapement pawl which is positioned to engage only the pins in the set state is then tripped and the pin wheel rotates to permit movement of the print element through the required escapement distance. The prior application fully discloses the operation of the proportional escapement mechanism in response to character selection and is specifically incorporated by reference in the present specification. This and the prior application are concerned with a single element typewriter of type manufactured and sold by International Business Machines Corporation, Armonk, N.Y., under the trademark "Selectric." The basic typewriter is fully described in the "IBM Customer Engineering Instruction Manual for the Series 72 Typewriter," Form No. 241-5032, copyright 1961.

The proportional escapement single element typewriter disclosed in the above identified application is adapted for manual justification operations when the mechanisms shown in copending application Ser. No. 580,478 entitled, "Justification Data Calculator and Display Device," filed Sept. 19, 1966 by Walter O. Cralle, Jr. and Joseph S. Morgan and assigned to the assignee of the present invention, are employed. Justification is accomplished by varying the size of the spaces between the words so that the right hand edges of the typed lines are aligned. A variable spacebar mechanism is incorporated which permits the typist, by setting a rotatable dial located in the keyboard area of the typewriter, to determine the escapement movement which occurs when the spacebar is depressed. In essence, the rotation of the dial controls the position of a tab located beneath the keyboard which in turn determines the escapement selection bails that will be moved upon actuation of the spacebar. This variable spacebar mechanism is shown in particular detail in FIGURE 4 of the copending application noted immediately above.

It is desirable to actuate such a proportional escapement typewriter automatically or from a remote location. For example, the typewriter may be coupled to a data processor operating on unjustified character information from input tapes to produce justified output copy at a relatively high rate of speed when compared to the rate output copy is produced when the typewriter is operated manually. A conventional arrangement for operating a typewriter automatically involves the use of a translator wherein a hooked seeker is attached to each keylever assembly in the typewriter. A plurality of selector magnet operated code slides control the selection of a seeker in accordance with coded input signals supplied to the magnets. After a seeker has been selected, it is driven or moved in a manner to actuate the associated keylever assembly.

While this arrangement is well suited for automatically actuating the normal character printing and most function operations associated with the proportional escapement typewriter, the setting and actuation of the variable spacebar mechanism presents considerable problems. The rotatable dial controlling the spacebar escapement width has to be set prior to the operation of the spacebar mechanism which means that an additional operating cycle must be provided in performing the variable spacebar function. The result is that the overall output rate of the proportional escapement typewriter is considerably below that of a typewriter where an extra operating cycle is not required when performing the spacebar function. In order to accomplish initial setting of the variable spacebar mechanism, one or more additional information channels must be provided. For example, if digital control techniques are employed to set the variable spacebar mechanism and there are seven possible settings of the mechanism, three additional channels for information would be required. Such an arrangement is undesirable because the required extra information channels materially complicate the overall system. Also, relatively expensive electrical-to-mechanical converting and actuating apparatus must be provided for decoding the digital information and actuating the variable spacebar mechanism. This latter apparatus must be located in the keyboard area of the typewriter which is extremely crowded and where available space is at a premium.

It has previously been proposed to provide a single element typewriter with no print mechanism wherein a character is selected and a printing operation initiated, but the print element is not permitted to engage the platen to effect printing. A variable spacebar operation is accomplished by manually setting the rotatable dial and then actuating a printing operation while preventing the print element from engaging the platen. The no-print apparatus comprises means for moving a cam follower to a cam portion where insufficient motion is imparted to the print element to throw the same against the printing platen. This arrangement is fully disclosed and claimed in copending application Ser. No. 573,020 entitled "Printing Apparatus With No Print Feature," by W. O. Cralle, Jr. and George T. Slaughter, filed Aug. 17, 1966 and assigned to the assignee of the present invention. A prior print impression control for a single element typewriter using a somewhat similar arrangement is disclosed and claimed in U.S. Patent 3,239,049 entitled "Impression Control Mechanism Automatically Selecting One of a Plurality of Cams," which is also assigned to the assignee of the present invention.

Briefly, the present invention relates to apparatus for operating a typewriter automatically to provide variable spacing increments between words and/or characters wherein received signals are employed to simultaneously select and actuate a character keylever assembly and a no print keylever assembly. The character keylever assembly is selected in accordance with the escapement width desired for the spacing operation while simultaneous selection and actuation of the no print keylever assembly prevents printing. To obtain spacing movements of various extents, a different one of the various character keylever assemblies normally used for printing characters of different widths is selected and actuated simultaneously with the no print keylever assembly in response to signals supplied from a data processor or a remote location, for example.

It is the primary or ultimate object of the present invention to provide variable spacebar mechanism for an automatically or remotely operated printer, such as a proportional escapement typewriter. As will be later explained, the simultaneous selection and actuation of one of the standard keylever assemblies and the no print keylever assembly accomplishes this result.

Another object of the invention is the provision of variable spacebar mechanism for an automatically operated proportional escapement typewriter wherein the time required for selecting and obtaining a variable spacebar increment is maintained at an absolute minimum. Both selection and actuation of the mechanism are accomplished in a single operating cycle of the proportional escapement typewriter. The result is that the overall output rates of the typewriter and the system of which it is a portion are materially increased relative to the comparable rates for systems employing conventional automatic actuating mechanism for the typewriter.

Yet another object of this invention is to provide variable spacebar mechanism which can be incorporated in a standard proportional escapement typewriter with a minimum of modification and change to the typewriter. The need for additional and complicated electrical-to-mechanical conversion equipment is eliminated and the number of data channels required is substantially reduced over those necessary using conventional automatic actuating techniques.

Still a further object of the invention is to provide variable spacebar mechanism for an automatically operated proportional escapement typewriter having the characteristics set forth above which is adapted to be manufactured on a production line basis at a relatively low cost.

The foregoing and other objects, features and advantages of the invention will be apparent from the following more particular description of a preferred embodiment of the invention as illustrated in the accompanying drawing.

In the drawing:

FIGURE 6 is a table showing the coding used in selecting the seekers of the translator with particular emphasis on the arrangement used for providing variable spaces between words and/or characters.

Figure 1:
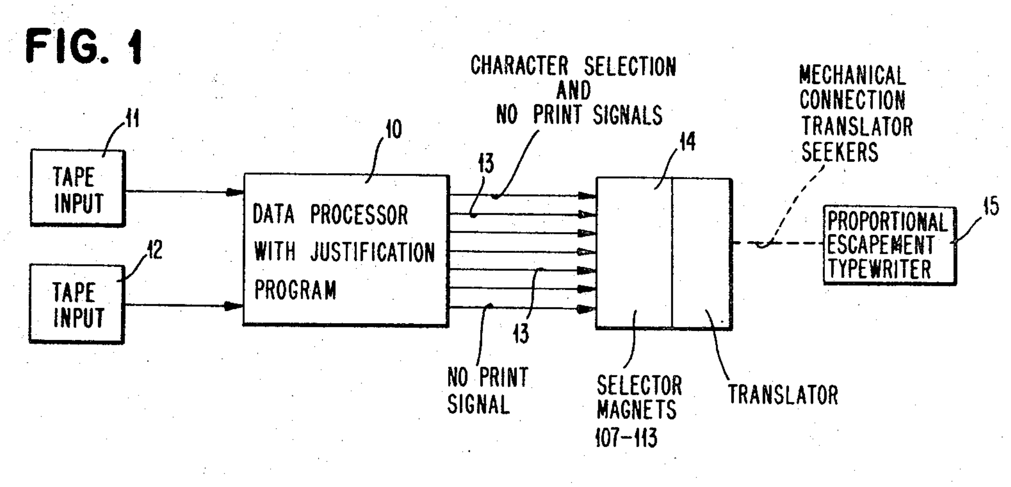
FIGURE 1 is a block diagram of a system incorporating an automatically operated proportional escapement typewriter having variable spacebar mechanism constructed and operated in accordance with the teachings of the present invention.

Referring now to the drawing, and initially to FIGURE 1 thereof, there is shown a representative justification system employed to automatically actuate a proportional escapement printer and provided with variable spacebar mechanism of this invention. In the illustrated system, a data processor 10 receives unjustified data from tape input devices 11 and 12 and manipulates this data in accordance with a stored justification program. The output from the data processor 10 comprises signals which appear on seven lines 13 which operate seven selector magnets of a translator 14. The translator 14 decodes the electrical signals and selects and actuates the character selection keylever assemblies and function operating assemblies of proportional escapement typewriter 15. Six of the signals appearing on lines 13 that are supplied to the translator 14 define the character or function to be performed by the typewriter while the signal on the remaining line 13 is a special no print signal. As will be hereinafter more fully explained, a variable spacing increment between words is provided by simultaneously supplying a no print signal with signals on selected ones of the other six lines 13 representing a character of preselected size. The size of the interword or intercharacter space is determined by the escapement width associated with the selected character. Different spacebar increments are obtained by selecting and actuating different ones of the character keylever assemblies while at the same time supplying the no print signal to actuate the no print keylever assembly.

Figure 2:
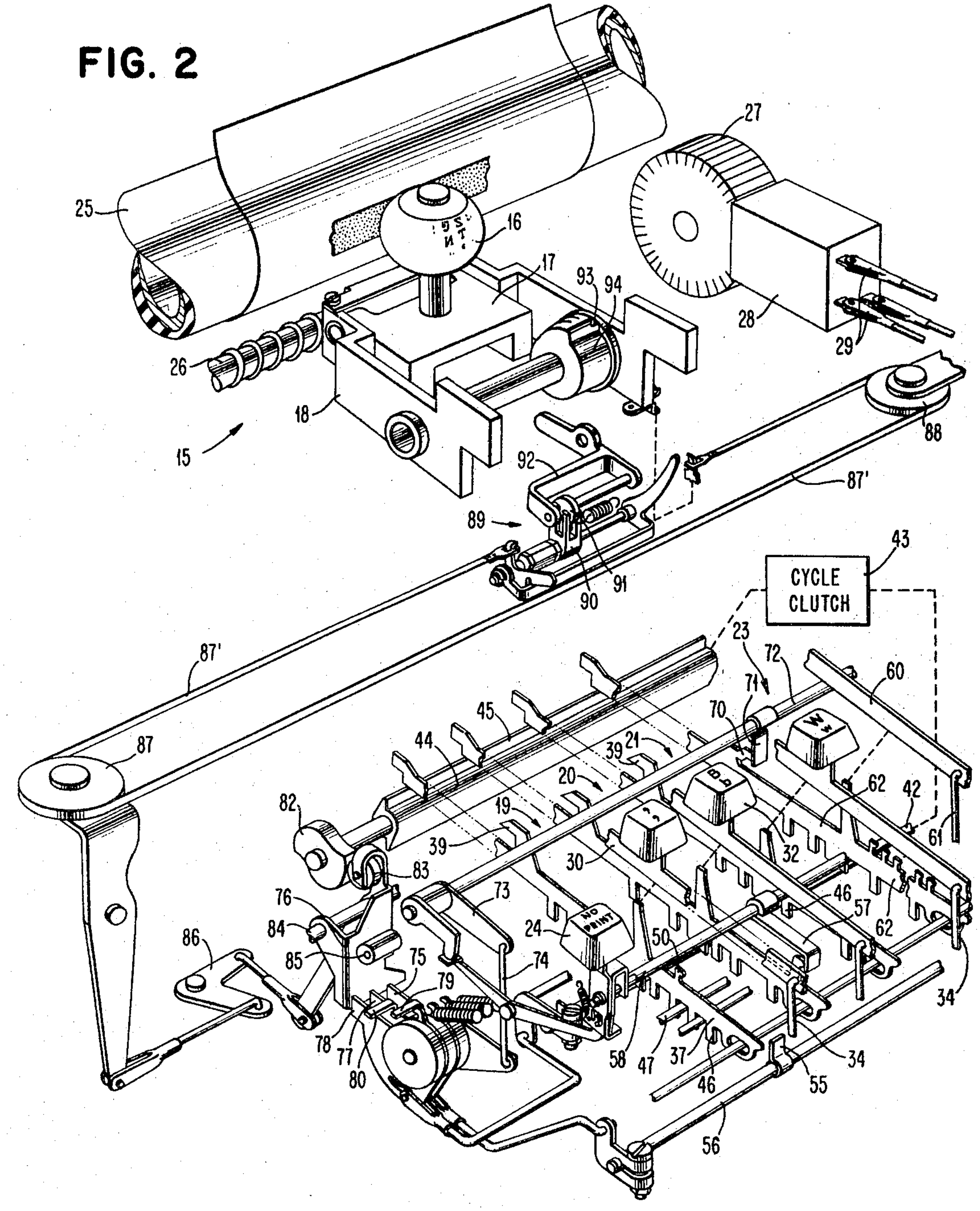
FIGURE 2 is an exploded front perspective view showing portions of the proportional escapement typewriter.

As shown in FIGURE 2, the justifying typewriter 15 comprises a single print element 16 mounted for movement on a rocker 17 which is in turn pivotally retained in a carrier 18. The print element 16 is adapted to be selectively tilted and rotated by character selection apparatus to bring a selected character to the printing point in response to actuation of the corresponding one of the character keylever assemblies, such as one of the representative keylever assemblies designated by reference numerals 19, 20 and 21. In addition to the usual character keylever assemblies, the typewriter has a no print keylever assembly 23 and a manually operated no print assembly which is controlled by no print key 24.

Following operation of one of the character keylever assemblies and movement of the print element 16 to position the selected character at the printing point, the rocker 17 is pivoted and the print element is thrown forward toward printing platen 25 to effect printing of the selected character. This is accomplished by rotating a print shaft in synchronism with the other mechanism of the typewriter to rotate a print cam which, acting through a print cam follower assembly, pivots the rocker toward the printing platen. Thereafter, a lead screw 26 is rotated and the carrier 18 is permitted to move in the escapement direction by a distance corresponding to the width of the previously selected and printed character. The proportional escapement apparatus is shown in detail in the above referenced copending patent application Ser. No. 311,373 and is schematically represented by pin wheel 27 carrying a plurality of pins and pin setting assembly 28. A plurality of clevis links 29 extend from the pin setting assembly 28 and are interconnected by means, not particulraly shown, to various escapement selection bails located in the keyboard area of the typewriter. This proportional escapement apparatus is the same as shown in the earlier referenced Patent No. 3,346,086 except the pin setting mechanism has been expanded to provide for a total of seven escapement increments. The distance between adjacent pins on the pin wheel defines a basic escapement unit and the escapement increments vary from three to nine units.

*Character keylever assemblies*

Figure 3:
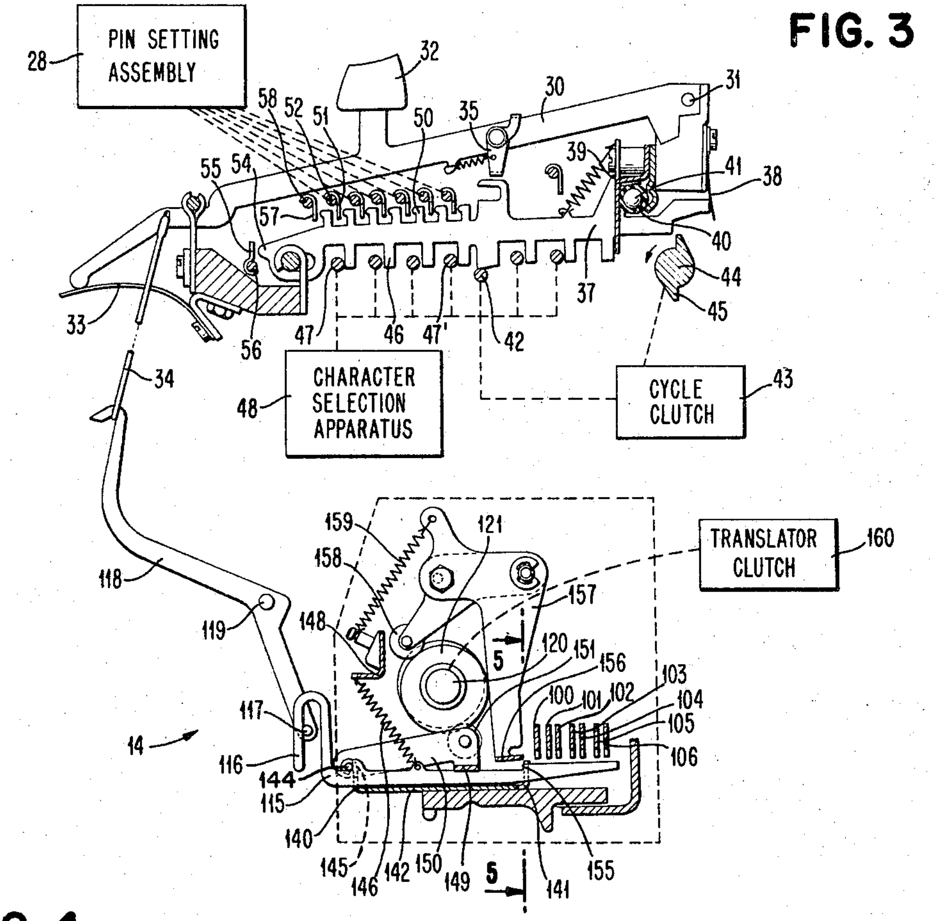
FIGURE 3 is a fragmentary side sectional view of a representative character keylever assembly and the translator.

A representative character keylever assembly is shown in FIGURE 3 of the drawing. This character keylever assembly is considered to be representative in that the coding of the character selection projections extending from the associated character interposer, the coding of the vanes on the escapement selection bails, and the coding of the vanes on the various velocity bails do not represent any actual character, but are shown in a manner to best illustrate the principles of operation which are involved in selecting a character, an escapement distance and a print impression or velocity setting when a keylever assembly is actuated.

The character keylever assembly comprises a keylever 30 which is pivoted at its rear end by rod 31 and mounts an appropriately marked keybutton 32. A leaf spring 33 engages the forward end of the keylever 30 and bias the same upwardly to its initial or home position. A depending actuating link 34 is loosely connected to the keylever between its extreme forward end and the keybutton 32. The use of the link 34 in actuating the keylever assembly in response to received signals will be hereinafter more fully explained.

Pivotally attached to the keylever 30 intermediate its ends is a dauber 35. When the keylever 30 is pivoted by a downward pulling force applied to actuating link 34, for example, the dauber 35 engages and depresses character interposer 37. The character interposer 37 moves vertically and is latched in its actuated position by latch spring 38. An extension 39 of the interposer 37 enters a slotted tube 40 filled with balls 41. The spacing between the balls 41 relative to the length of the tube 40 is such that only one of the interposer extensions 39 can be received between the balls 41 at any one time. This provides an interlock which prevents two of the character interposers 37 having extensions 39 from being actuated and latched down at the same time.

As the character interposer 37 is depressed and latched by spring 38, a cycle clutch bail 42 is moved to activate a cycle clutch schematically depicted at 43 which causes fluted filter shaft 44 to rotate through 180 degrees. As the filter shaft 44 rotates, one of the lobes or flutes 45 thereon engages the rear end of the character interposer 37 and drives the same forward from beneath the spring 38. The forward movement of the character interposer 37 results in the selection of the corresponding character on the print element, selection of the escapement increment associated with the character and selection of the correct printing density or velocity setting for the character. The character selection is accomplished in the same manner as in the basic "Selectric" typewriter wherein properly coded projections 46 depending from the character interposer 37 move selected ones of the six character selection bails 47 to actuate character selection apparatus 48. The character selection apparatus controls the rotating and tilting movements of the print element 16. In general, each of the character selection bails 47 is connected to a latch which is removed from driven coupled relation with an oscillating cycle bail by movement of the corresponding selection bail in a manner that is fully explained on pages 10–28 of the above mentioned instruction manual.

Escapement distance selection is normally accomplished by one of the lugs 50 extending from the upper surface of the character interposer 37 engaging one of the coded escapement selection vanes 51 to rotate the corresponding one of the six escapement selection bails 52 when the character interposer 37 is engaged and driven forward by one of the flutes 45 on the filter shaft 44. The movement of the selected escapement selection bail 52 is transmitted to the pin setting assembly 28 so that the pins on the pin wheel 27 within the confines of the pin setting assembly 28 are manipulated to provide for the desired escapement movement. Each of the escapement selection bails 52 is associated with a predetermined one of the escapement increments having widths of three to eight escapement units and only one of the bails is actuated by the forward movement of any selected character interposer 37. If an escapement movement of nine units is required (the largest escapement distance), the coding of the vanes 51 is such that none of the escapement selection bails 52 are rotated by the forward movement of the character interposer and the pin setting assembly 28 is operative under these conditions to automatically manipulate the pins for a nine unit escapement movement. The escapement selection bails 52 and vanes 51 are mounted for transverse sliding movement relative to the transversely aligned character interposer 37 in response to case shift operations. In this manner a different escapement increment may be associated with a character keylever assembly in accordance with the case shift status of the typewriter. The coding of the character selection vanes 51 is such that the escapement increments indicated by the two columns on the right side of the chart forming FIGURE 6 of the drawings are obtained in accordance with the character selected and the case shift status of the proportional escapement typewriter. The escapement selection apparatus itself does not form a portion of the present invention and a full description of basic operating mechanism involved is described in the above identified copending patent application Ser. No. 311,373.

The third function which is performed by the forward driven movement of the selected character interposer 37 is the selection of the correct printing velocity or impression. If the nose 54 at the forward end of the selected character interposer 37 engages coded vane 55 to rotate the low velocity bail 56, a drive connection is established which causes the print element 16 to be thrown toward the printing platen 25 with a relative low velocity. This arrangement is most clearly shown in connection with keylever assembly 19 in FIGURE 2 of the drawing. Similarly, if coded vane 57 is rotated by one of the lugs 50 to move medium velocity bail 58, then the print element 16 moves toward the printing platen 25 with a medium printing velocity as is best illustrated in connection with keylever assembly 20. If the low or medium velocity bails 56 and 58 are not rotated and the no print keylever assembly is not energized when the character interposer 37 is driven forward as is the situation with keylever assembly 21, for example, the print element 16 will be thrown toward the printing platen 25 with maximum printing velocity. This arrangement is fully disclosed in the above referenced copending patent application Ser. No. 573,020 and will be further considered when the construction and operation of the no print keylever assembly is described.

*No print keylever assembly*

Figure 4:
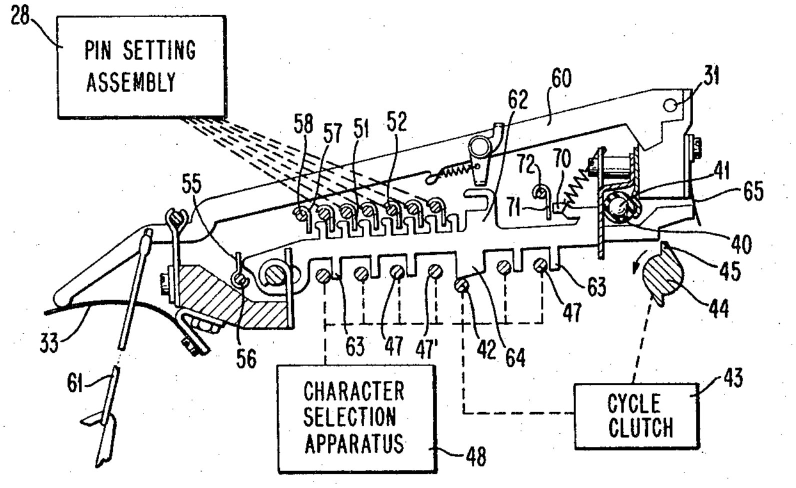
FIGURE 4 is a fragmentary side sectional view of the no print keylever assembly.

The no print keylever assembly 23 is best shown in FIGURE 4 of the drawing and comprises a no print keylever 60 pivoted about rod 31 and having a depending actuating link 61 connected thereto. However, this keylever assembly is not provided with a keybutton so that it cannot be actuated from the keyboard by the typist. A no print interposer 62 is associated with the no print keylever 60 and the vanes 51 of the character escapement selection bails 52 are so coded that none of these bails are rotated by forward movement of the no print interposer 62 irrespective of the case shift status of the proportional escapement typewriter. The no print interposer 62 has no extension similar to the extensions 39 on the character interposers 37 which are adapted to enter the ball filled slotted tube 40. The significance of this is that the no print keylever assembly 23 can be actuated in response to a pull applied to keylever actuating link 61 simultaneously with the actuation of any other character or function keylever assembly. Coded projections 63 extend from the bottom of the no print interposer for actuating certain of the character selection bails 47 in a manner and for a purpose to be later described.

This interposer also has a depending lug 64 for moving cycle clutch bail 42 when the interposer is moved down to its actuated position. The no print interposer 62 is latched in its depressed and actuated position by latch spring 65 until this interposer is engaged and driven forward by one of the flutes 45 on the filter shaft 44.

Adjacent the rear end of the no print interposer 62 is a forwardly projecting tab 70 which is adapted to engage coded vane 71 to rotate a no print bail 72 as the no print interposer is driven forward by the filter shaft 44. The coding on the vanes 55 and 57 is such that low and medium velocity bails 56 and 58 are not actuated by forward movement of the no print interposer 62. As shown in FIGURE 2 of the drawing, rotation of the no print bail 72 pivots bell crank 73 counterclockwise and pulls link 74 upward. Velocity stop 75 is moved counterclockwise sufficiently so that it is moved out of contacting engagement with impression cam follower 76. Velocity stops 77 and 78 are also rotated counterclockwise and pulled out of the way of impression cam follower 76 by tab extensions 79 and 80. Under these circumstances none of the velocity stops 75, 77 or 78 is in a position for engagement with impression cam follower 76. It is noted the mechanical arrangement is such that all of the velocity stops are positioned out of engaging relation with the impression cam follower 76 once the no print bail 72 is pivoted even though the low or medium velocity bail 56 or 58 may also have been actuated.

Mounted on one end of the filter shaft 44 is an impression cam 82. This cam is engaged by roller 83 and pivots impression cam follower 76 about rod 84 when the filter shaft is rotated. During a no print operational cycle, the impression cam follower 76 is free to move to the furthest extent permitted by adjustable final stop 85. The movement of the impression cam follower 76 acting through a linkage system 86 moves a pulley 87 to the right. An actuating tape 87' extending about movable pulley 87 and relatively fixed pulley 88 has its opposite ends attached to a spring biased slider assembly 89 and the print element carrier 18, respectively. The slider assembly 89 includes a yoke 90 mounting a roll 91 of the print cam follower assembly 92. During a no print operation the pulley 87 moves sufficiently to the right to permit roll 91 to be positioned opposite the no print portion 93 of the print cam 94. The no print portion 93 of the print cam 94 has no or negligible rise so that no effective drive force is imparted to the print element 16 to drive the same toward the printing platen 25 when the print cam is rotated during a printing operational cycle of the proportional escapement typewriter.

The print cam 94 has portions other than the no print portion 93 and the roll 91 is positioned adjacent these other portions in response to activation of the low velocity bail 56, medium velocity bail 58 or the lack of actuation of bails 56 and 58 to cause movement of the print element 16 toward the printing platen with low, medium or high velocity, respectively. This arrangement is employed to control the density of printing. Actuation of the no print key 24 also is operative to position the roll 91 adjacent the no print portion 93 of the print cam 94. These latter mechanisms are not specifically required for the functioning of the apparatus of the present invention and therefore will not be described further in this specification. However, they are fully set forth in the above identified copending patent application Ser. No. 573,020.

*Translator assembly*

As explained above, the keylever assemblies of the proportional escapement typewriter 15 are selectively actuated by means of the translator 14 which is located beneath the keyboard and which is under control of signals supplied by the data processor 10. The translator comprises seven code slides corresponding, respectively, to the seven positions of a predetermined code system. These code slides are indicated by the reference numerals 100–106 with the slide 106 being designated as the no print slide. The translator also comprises seven selector magnets 107–113 (see FIGURES 1 and 5 of the drawing) controlling the relative positions of the code slides. The six code slides 100–105 and the corresponding six selector magnets 107–112 receive the six signals from the data processor 10 which define normal character printing and function operations performed by the proportional escapement typewriter 15. The seventh slide 106 and its selector magnet 113 are associated with the no print signal supplied by the data processor 10 to permit simultaneous selection and activation of no print keylever assembly 23 and a character keylever assembly to provide spacing movement of predetermined size without printing.

A plurality of seekers 115 each having a hook-shaped left end 116 are provided for actuating the character and function keylever assemblies of the proportional escapement typewriter. The left hook-shaped end of each seeker 115 engages a pin 117 of a lever 118 which is in turn pivoted intermediate its ends by a rod 119. The hooked upper end of each lever 118 is received over the lower end of an associated keylever assembly actuating link 34 or 61. The arrangement is such that when a seeker 115 is selected, it is moved to the rear from the position shown in FIGURE 3 of the drawing. The lever 118 is pivoted counterclockwise about rod 119 so that a pulling force sufficient to actuate the corresponding keylever assembly is applied via the actuating link 34 or 61. The translator also includes an operating shaft 120 having a number of control cams 121 mounted thereon.

The seven code slides 100–106 are arranged vertically and extend transversely beneath the keyboard of the proportional escapement typewriter and in spaced parallel relation with respect to one another. The code slides are supported at their two ends for limited longitudinal sliding movement by horizontally disposed end comb plates 122 suitably fixed to side flange members 123 of a main frame plate and being guided intermediate their ends by horizontal comb plates 124 which are also attached to the frame. Suitable tension springs 125 serve to hold integral projections 126 on the code slides against the intermediate comb plates 124. Each code slide is normally urged to move to the right as viewed in FIGURE 5 of the drawing by a compression spring 127 surrounding an operating pin 128 which is slidably mounted in spaced flanges 129 of a bracket at the left hand side of the translator.

Figure 5:
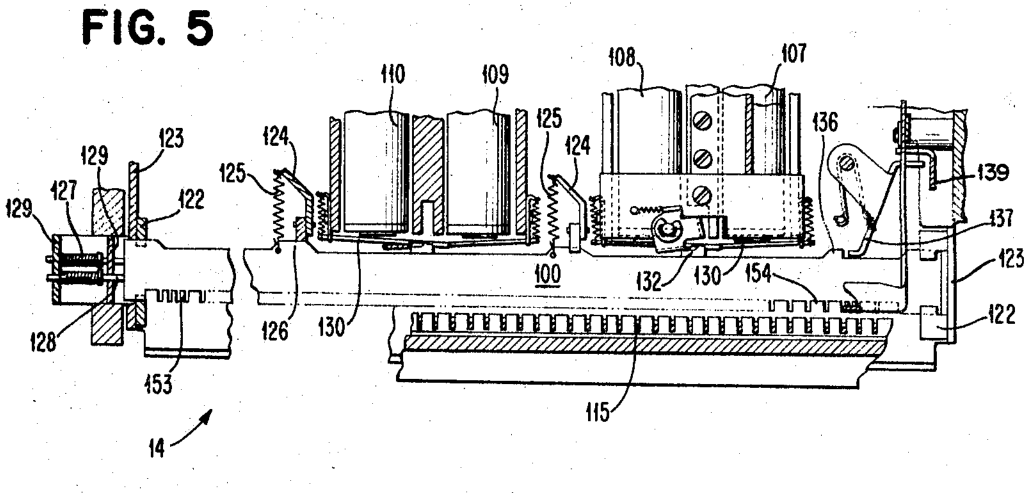
FIGURE 5 is a front view of the translator employed in the apparatus of this invention taken along the section line 5—5 of FIGURE 3.

Each of the code slides 100–106 is normally held in an inactive or latched position against the force of its related compression spring 127 by the corresponding armature 130 of the associated one of the selector magnets 107–113. In FIGURE 5 of the drawing the code slide 100 is shown provided with an integrally formed lug 132 having a latching point engaging the left end of the pivoted armature 130 of its related selector magnet 107. Each of the other code slides is provided with a similar latching lug 132 that engages the armature 130 of its related translator selector magnet. The arrangement is such that the code slides are selectively released for movement to the right under the action of the compression springs 127 in accordance with the actuating signals supplied from the data processor 10 until lugs 136 of the released code slides engage normally stationary restoring bail 137. All released code slides are returned at the end of each operating cycle of the translator to their latched positions by restoring bail 137. This restoring bail is operated by a restoring lever 139 that is driven by one of the cams 121 on the operating shaft 120.

As explained above, one of the seekers 115 is provided for each of the character and function keylever assemblies. The seekers extend rearwardly and the straight rear ends thereof are arranged transversely of the seven code slides 100–106 on the opposite side of the code slides from the selector magnets 107–113. The seekers 115 are maintained against transverse movement by spaced comb plates 140 and 141 which are formed as integral flanges of a rigid frame plate 142 extending transversely beneath the keyboard. The upper edge of the forward comb plate 140 is bent over to provide a means for holding a rod 144 which extends transversely of and beneath the keylever assemblies and serves both as a fulcrum and as a retaining means for the front ends of the seekers 115. Each of the seekers has an integral lug 145 which is adapted to engage the rod 144 and thereby limit forward movement of the seeker.

A tension spring 146 connects each seeker 115 with a flange of a fixed frame plate 148 and thereby constantly urges the seeker against a seeker positioning bail 149, the latter extending transversely across all of the seekers 115 and being connected at its outer ends to the rear ends of a pair of arms 150 which are in turn pivotally supported from rod 114. Cams 121 carried on opposite ends of the power shaft 120 are engaged by cam follower rolls 151 which are held in continuous engagement with the cams by tension springs 146 that engage seekers 115. In the normal or inactive position of the translator, the two cams 121 hold the positioning bail 149 so that the rear straight ends of the seekers 115 are held out of seeking relation with the code slides 100–106.

The lower longitudinal edge of the code slide 100 facing the seekers 115 is formed with a series of tabs 153 which may be removed by a suitable tool before assembling the translator to provide permutation slots 154. The remaining code slides are similarly formed. Each seeker 115 is disposed opposite either a tab 153 or a slot 154 in each code slide when the slide is both in its latched and its released position. The tabs 153 of the code slides 100–106 are permutatively removed in accordance with the coding chart set forth in FIGURE 6 of the drawing so that for each activated positional relationship of the code slides the straight rear ends of one or two of the seekers 115 will be opposite a slot 154 in each of the seven code slides and such seeker or seekers are the only ones that can be operated for actuating the related character and/or function keylever assemblies. For the normal character printing and function operations of the proportional escapement typewriter, only one seeker 115 is selected at a time. For example, if only the code slides 101, 103 and 104 are released in response to signals received from the data processor 10, the straight rear end of the seeker 115 in the sixteenth position in the translator is permitted to move into a continuous row of slots in the code slides. This seeker is associated with the character D and when the seeker is driven to the rear in a manner to be further explained, the corresponding keylever assembly is actuated to provide an escapement increment of six or eight units and printing of a lower or upper case D, respectively, depending upon the case shift status of the proportional escapement typewriter.

The code slide 106 is associated with the spacebar or no print function and has all tabs 153 removed except the tab 153 associated with the seeker in translator position four. This seeker corresponds to the no print keylever assembly 23 and it should be noted from the coding chart of FIGURE 6 of the drawing that this seeker is selected only when a signal from the data processor 10 actuates solenoid 113 to move no print code slide 106. The position of code slide 106 does not affect or interfere with the operation of the other seekers whose actuation is based on the selection of the code slides 100–105 and conversely the no print seeker in translator position four can be selected independently of the states of the other code slides and seekers. The arrangement is such that the no print seeker in translator position four can be selected simultaneously and in combination with any other character or function seeker. This arrangement is employed to provide a variable spacebar mechanism for the proportion escapement typewriter. For example, if the typewriter is in its lower case state and a spacing of eight units between adjacent words or characters is required, the data processor supplies signals to the translator so that both the no print seeker in translator position four and the seeker in translator position eleven connected to the W keylever assembly are simultaneously selected. The fact that the seeker in the eleventh position in the translator performs a secondary function when selected simultaneously with the no print seeker is designated by the asterisk on the chart of FIGURE 6 of the drawing. The other character selection seekers which are employed with the no print seeker to provide variable spaces between words or characters are also indicated by asterisks on this chart.

At a selected point in each cycle of operation of the translator the cams 121 and springs 146 will provide for movement of the positioning bail 149 so that the seekers 115 may pivot about the rod 144 and the rear ends thereof may move into seeking relationship with respect to the seven code slides. The seeker 115 which is opposite a continuous row of slots in the code slides will then move into such row of slots so that a ledge portion 155 thereof is disposed in the rearward path of travel of an operating bail 156. The operating bail 156 extends across all of the seekers 115 and is fixed at its two outer ends to a pair of operating bail levers 157. The two bail levers 157 are pivoted on fixed studs projecting inwardly from the translator frame. Each bail lever 157 carries a follower roller 158 engaging a cam 121. The two rollers 158 are kept in engagement with the cams by tension springs 159.

From the foregoing, it will be apparent that during each revolution of the power shaft 120, which comprises an operating cycle of the translator, and after the cams 121 have positioned a selected seeker or seekers 115 beneath the operating bail 156, the cams 121, rollers 158 and springs 159 will pivot the bail levers 157. During such movement the operating bail 156 will engage and move the selected seeker or seekers 115 to the right and thereby actuate the keylever assembly or assemblies to which such selected seeker or seekers are connected by levers 118.

In the illustrated embodiment the cams 121, through the springs 146 and positioning bail 149, move the seekers 115 into seeking relationship with the seven code slides 100–106 at the outset of the operating cycle of the translator and move such seekers out of seeking relationship near the end of each such operating cycle. The cams 121 also start operating bail 156 moving the selected seeker or seekers to the rear soon after movement of the positioning bail 149. The operating bail 156 is restored to its inactive position near the end of each translator operating cycle. The positioning bail 149 disconnects the selected seeker or seekers 115 from the operating bail 156 when the seekers are engaged by the bail 149 just before the restoration of the operating bail 156.

Each operating cycle of the translator is initiated by engaging a one revolution translator clutch 160 which interconnects operating shaft 120 with a power source, not shown. The clutch 160 is engaged under control of the data processor in synchronism with the flow of data to the translator and the operation of the proportional escapement typewriter.

*Operation*

Considering now the operation of the apparatus described above, during a nomal character or function selection operation the data processor 10 supplies signals to the translator 14 which causes one and only one of the seekers 115 to be selected and driven to actuate the corresponding keylever assembly. For example, if the seeker magnets 108, 109, 111 and 112 are actuated to release code slides 101, 102, 104 and 105, the seeker 115 in translator position twenty-seven will be selected and driven to actuate the keylever assembly associated with the character Y. An upper or lower case character Y will be printed depending on the case shift status of the proportional escapement typewriter. The typewriter is latched in upper case position and released to return to lower case status in response to selection of the upper and lower case seekers in translator positions three and one, respectively. The data processor comprises means, such as a bistable storage element, which stores the case shift status of the typewriter and this information is employed in generating the electrical signals supplied to the translator.

When the justification routine performed by the data processor specifies a variable spacing increment is required between words and/or characters, the data processor operates to supply signals to the translator so that the no print seeker in translator position four and one of the other seekers associated with one of the characters indicated by the asterisks in the chart of FIGURE 6 of the drawing are selected and actuated simultaneously to cause an escapement movement of the print element 16 corresponding to the width associated with the selected character. However, printing is not effected since the roll 91 of print cam follower assembly 92 has been moved to portion 93 of the print cam 94 having no or negligible rise and the print element 16 is not thrown toward the printing platen 25 with sufficient velocity to cause printing. Simultaneous actuation of the character and no print keylever assemblies is permitted since the no print interposer 62 does not have an extension which is adapted to enter the ball fitted slotted tube 40.

In order to obtain variable spaces between words or characters it is only necessary that the data processor supply signals to the translator which will cause selection and actuation of a character keylever assembly having an escapement width associated therewith that corresponds to the desired spacing increment considering the case shift status of the typewriter while at the same time operating the no print keylever assembly. In one constructed embodiment of apparatus embodying the teachings of this invention and as represented by the coding chart of FIGURE 6 of the drawing, no lower case character having an escapement width of seven units was provided. This presented a limitation relative to obtaining a seven unit spacing increment between words or characters which was remedied by using the normal variable spacebar mechanism and presetting the rotatable dial to a position whereby the spacebar keylever assembly, when operated, provides an escapement distance of seven units. A special translator seeker, such as the seeker in translator position six, is selected and actuated to operate the variable spacebar mechanism of the proportional escapement typewriter under these conditions.

The same result can also be obtained by supplying signals to the translator in such a manner that a three unit spacing operation is immediately followed by a four unit spacing operation to provide a total space of seven units between words or characters. While this latter method of operation requires an additional cycle of operation of the proportional escapement typewriter to obtain the desired spacing increment, it may be preferred in certain instances since it does not depend on the proper setting of a rotatable dial by an operator or attendant. It should also be apparent that spacing increments greater than the maximum of nine units obtainable in one cycle of operation can be provided by selecting proper combinations of the spaces during successive operating cycles of the proportional escapement typewriter.

It should be noted in FIGURE 4 of the drawing that the no print interposer 62 has projections 63 extending therefrom which engage all but one of the character selection bails 47. The coding of these projections is such that when the no print interposer is driven forward by one of the flutes 45 on the filter shaft 44, the character selection apparatus 48 selects the character at the home position on the print element and no rotation or tiliting movement is imparted to the print element 16. This condition is signified by all of the character selection bails 47 with the exception of bail 47′ being actuated. Character keylever assemblies having character interposers 37 whose projections 46 are also coded in a manner so that character selection bail 47′ is not moved when these character interposers are driven forward are selected for use during variable spacebar operations whenever possible. In this manner the print element 16 is not rotated or tilted during at least a major portion of the spacing operations and wear on the character selection apparatus 48 is maintained at a minimum.

It should now be apparent that the objects initially set forth have been accomplished. Of particular significance is the provision of highly simplified but unobvious means which permit a proportional escapement typewriter to be automatically or remotely operated to provide variable spaces between words and/or characters.

What is claimed is:

1. Variable spacebar mechanism for a proportional escapement typewriter having a print element and a printing platen comprising:

a plurality of character keylever assemblies associated with characters of different widths;

print element positioning means for moving said print element to bring a selected character to a printing position opposite said printing platen;

proportional escapement means for controlling escapement movement of said print element relative to said printing platen in accordance with the width of the selected character;

means for moving said print element toward said printing platen to effect printing;

means responsive to actuation of a character keylever assembly for actuating said print element positioning means to select and said means for moving to print a character associated with the actuated character keylever assembly and then to actuate said proportional escapement means to control escapement movement of said print element relative to said printing platen by a distance corresponding to the width of the selected character;

a no print keylever assembly;

means responsive to actuation of said no print keylever assembly to render ineffective said means for moving said print element toward said printing platen; and means for simultaneously actuating said no print keylever assembly with any of a group of said character keylever assemblies during different operating cycles of said proportional escapement typewriter to effect variable spacing movements of said print element relative to said printing platen corresponding to the widths of the characters associated with said actuated character keylever assemblies without printing.

2. Apparatus according to claim 1 further characterized by:

said means for moving said print element toward said printing platen comprises a rotatable print cam and a print cam follower assembly; and said means responsive to actuation of said no print keylever assembly to render ineffective said means for moving said print element comprises means for changing the position of said print cam follower assembly relative to said print cam.

3. Apparatus according to claim 1 further characterized by:

said means for simultaneously actuating comprises a translator having a plurality of code slides and means for controlling movement of said code slides in one direction;

each of said code slides having a coded edge;

a plurality of character keylever translator seekers disposed in generally transverse relation and moveable in another direction into seeking relation relative to the coded edges of said code slides;

one of said character keylever translator seekers moving into seeking relation with an aligned slot in the coded edges of said code slides in accordance with the actuation of said means for controlling to select and actuate a character keylever assembly;
a no print keylever translator seeker; and
means to actuate said no print keylever translator seeker simultaneously with any one of a group of said character keylever translator seekers.

4. Apparatus according to claim 3 further characterized by:
said means to actuate said no print keylever translator seeker comprises a no print code slide;
said no print code slide effecting the selection of only said no print keylever translator seeker; and
means to control movement of said no print code slide.

5. Variable spacebar mechanism for a proportional escapement typewriter having a print element and a printing platen comprising:
a plurality of character assemblies associated with characters of different widths;
print element positioning means for moving said print element to bring a selected character to a printing position opposite said printing platen;
proportional escapement means for controlling escapement movement of said print element relative to said printing platen in accordance with the width of the selected character;
means for moving said print element toward said printing platen to effect printing;
means responsive to actuation of a character assembly for actuating said print element positioning means to select and said means for moving to print a character associated with the actuated character assembly and then to actuate said proportional escapement means to control escapement movement of said print element relative to said printing platen by a distance corresponding to the width of the selected character;
a no print assembly;
means responsive to actuation of said no print assembly to render ineffective said means for moving said print element toward said printing platen; and
remotely controlled means for simultaneously actuating said no print assembly and any of a group of said character assemblies during different operating cycles of said proportional escapement typewriter to effect spacing movements of said print element relative to said printing platen corresponding to the widths of the characters associated with said actuated character assemblies without printing.

6. Apparatus according to claim 5 characterized by:
each of said character assemblies and said no print assembly comprises a keylever and an interposer;
means to latch each of said interposers in an active position when the corresponding keylever is actuated;
a filter shaft for engaging and moving interposers which are latched in said active position;
means responsive to movement of an interposer to said active position to actuate said filter shaft to engage a latched interposer and move the same for actuating said print element positioning means and said proportional escapement means;
said means for simultaneously actuating comprising a translator having a plurality of code slides and means for controlling movement of said code slides in one direction;
each of said code slides having a coded edge thereon;
a plurality of character translator seekers disposed in generally transverse relation and movable in another direction into seeking relation relative to the coded edges of said code slides;
means connecting each of said character translator seekers to one of said character assemblies;
one of said character translator seekers moving into seeking relation with an aligned slot in the coded edges of said code slides in accordance with the actuation of said means for controlling to select and actuate a character assembly;
a no print translator seeker and means connecting said no print translator seeker to said no print assembly;
means to actuate said no print translator seeker simultaneously with any one of a group of said character translator seekers;
said means to actuate comprising a selector magnet associated with each of said code slides and said no print translator seeker for controlling movement thereof; and
a source of coded electrical signals for selectively actuating said selector magnets.

7. Variable spacebar mechanism for a proportional escapement typewriter having a print element and a printing platen comprising:
a plurality of character assemblies associated with characters of different widths;
proportional escapement means for controlling escapement movement of said print element relative to said printing platen in accordance with the width of the selected character;
means for moving said print element toward said printing platen to effect printing;
means responsive to actuation of a character assembly for actuating said means for moving to print a character associated with the actuated character assembly and then to actuate said proportional escapement means to control escapement movement of said print element relative to said printing platen by a distance corresponding to the width of the selected character;
a no print assembly;
means responsive to actuation of said no print assembly to render ineffective said means for moving said print element toward said printing platen; and
means for simultaneously actuating said no print assembly and any of a group of said character assemblies during different operating cycles of said proportional escapement typewriter to effect spacing movements of said print element relative to said printing platen corresponding to the widths of the characters associated with said actuated character assemblies without printing.

References Cited

UNITED STATES PATENTS

| | | | |
|---|---|---|---|
| 2,067,821 | 1/1937 | Bell | 197—84 X |
| 2,390,413 | 12/1945 | Ayres | 197—84 X |
| 2,555,734 | 6/1951 | Dodge | 197—84 X |
| 2,700,447 | 1/1955 | Blodgett | 197—84 X |
| 2,879,876 | 3/1959 | Palmer et al. | 197—16 |
| 2,919,002 | 12/1959 | Palmer | 197—16 |

ROBERT E. PULFREY, *Primary Examiner.*
E. T. WRIGHT, *Assistant Examiner.*